(12) United States Patent
Tsai (10) Patent No.: US 6,409,190 B1
(45) Date of Patent: Jun. 25, 2002

(54) FRONT SUSPENSION DEVICE FOR A SKATE CART

(76) Inventor: Shui-Te Tsai, No. 14, Lane 69, Tian Jin Road Section 4, Pei Tun Dist., Taichung City (TW)

( * ) Notice: Subject to any disclaimer, the term of this patent is extended or adjusted under 35 U.S.C. 154(b) by 0 days.

(21) Appl. No.: 09/583,108

(22) Filed: May 15, 2000

(30) Foreign Application Priority Data

Feb. 21, 2000 (TW) ........................................ 89202932 U (51) Int. Cl.[7] ............................................... B62M 1/00
(52) U.S. Cl. ................. 280/87.041; 280/638; 280/270; 280/47.22
(58) Field of Search ........................ 280/87.041, 87.01, 280/87.1, 87.021, 638, 639, 641, 63, 200, 270, 655.1, 47.12, 47.22, 65, 14.27, 14.28

(56) References Cited

U.S. PATENT DOCUMENTS

| | | | | |
|---|---|---|---|---|
| 2,490,014 A | * | 12/1949 | Brand | 296/26 |
| 4,180,280 A | * | 12/1979 | Doveri | 280/277 |
| 5,518,081 A | * | 5/1996 | Thibodeau | 180/210 |
| 6,173,976 B1 | * | 1/2001 | Lee | 280/87.05 |
| 6,206,387 B1 | * | 3/2001 | Tsai | 280/87.041 |
| 6,234,501 B1 | * | 5/2001 | Chen | 280/87.041 |
| 6,273,205 B1 | * | 8/2001 | Tsai | 180/181 |
| 6,279,930 B1 | * | 8/2001 | Chang et al. | 280/87.042 |
| 6,347,681 B1 | * | 2/2002 | Patmont et al. | 180/220 |
| 2001/0030404 A1 | * | 10/2001 | Liu | 280/87.041 |
| 2002/0005309 A1 | * | 1/2002 | Patmont et al. | 180/220 |

* cited by examiner

Primary Examiner—J. J. Swann
Assistant Examiner—J. Allen Shriver (57) ABSTRACT

A skate cart includes a board with a rear wheel connected to a rear end of the board and a head tube connected to a front end of the board. A steerer tube rotatably extends through the head tube and a fork member is located on a lower end of the head tube. Two plates are respectively pivotably connected to two sides of the fork member and a front wheel is connected between the two plates. A spring is connected between the plate and the side of the fork member the same side of the front wheel. The front wheel together with the two plates move toward the head tube by compressing the springs so as to absorb vibration from the road.

4 Claims, 9 Drawing Sheets

FRONT SUSPENSION DEVICE FOR A SKATE CART

FIELD OF THE INVENTION

The present invention relates to a front suspension device for a skate cart wherein two plates are pivotally connected to a front fork and a front wheel connected between the two plates. Two springs are respectively connected between the front fork and the two plates.

BACKGROUND OF THE INVENTION

A conventional skate cart generally includes a board with a rear wheel and a connection member extends from a front end of the board. A head tube is connected to the connection member and a steerer tube of a front fork rotatably extends through the head tube. A handlebar stem is securely connected to the steerer tube and a front wheel is connected between the front fork. The skate cart is a fancy stuff for youth to ride on roads. However, when the skate cart is ridden on a serrated road, shaking will be transferred to the handlebar directly and this could affect the rider to hold the handlebar. Because the wheels are small so that the front wheel is easily to jump and/or turns by the serrated road, and this means dangerous accidents could happen. Furthermore, when the skate cart goes downward from a slope, the frequent vibration makes the rider's hands on the handlebar uncomfortable.

The present invention intends to provide a front suspension device for a skate cart and the device allows the front wheel moves upward relative to the front fork so as to absorb vibration on a serrated road.

SUMMARY OF THE INVENTION

In accordance with one aspect of the present invention, there is provided a skate cart and comprising a board having a rear wheel on a rear end of the board and a connection member extending from a front end of the board with a head tube connected to the connection member. A steerer tube rotatably extends through the head tube and a fork member is located on a lower end of the head tube. Two plates are respectively pivotally connected to two sides of the fork member and a front wheel is connected between the two plates. The two plates each are connected to one end of a spring and the other end of each of the springs is connected to respective one of the two sides of the fork member.

The object of the present invention is to provide a front suspension device for a skate cart, the front wheel can be moved relative to the front fork by compressing two springs connected between the front fork and two plates between which the front wheel is connected.

These and further objects, features and advantages of the present invention will become more obvious from the following description when taken in connection with the accompanying drawings which show, for purposes of illustration only, several embodiments in accordance with the present invention.

DESCRIPTION OF THE PREFERRED EMBODIMENTS

Figure 1:
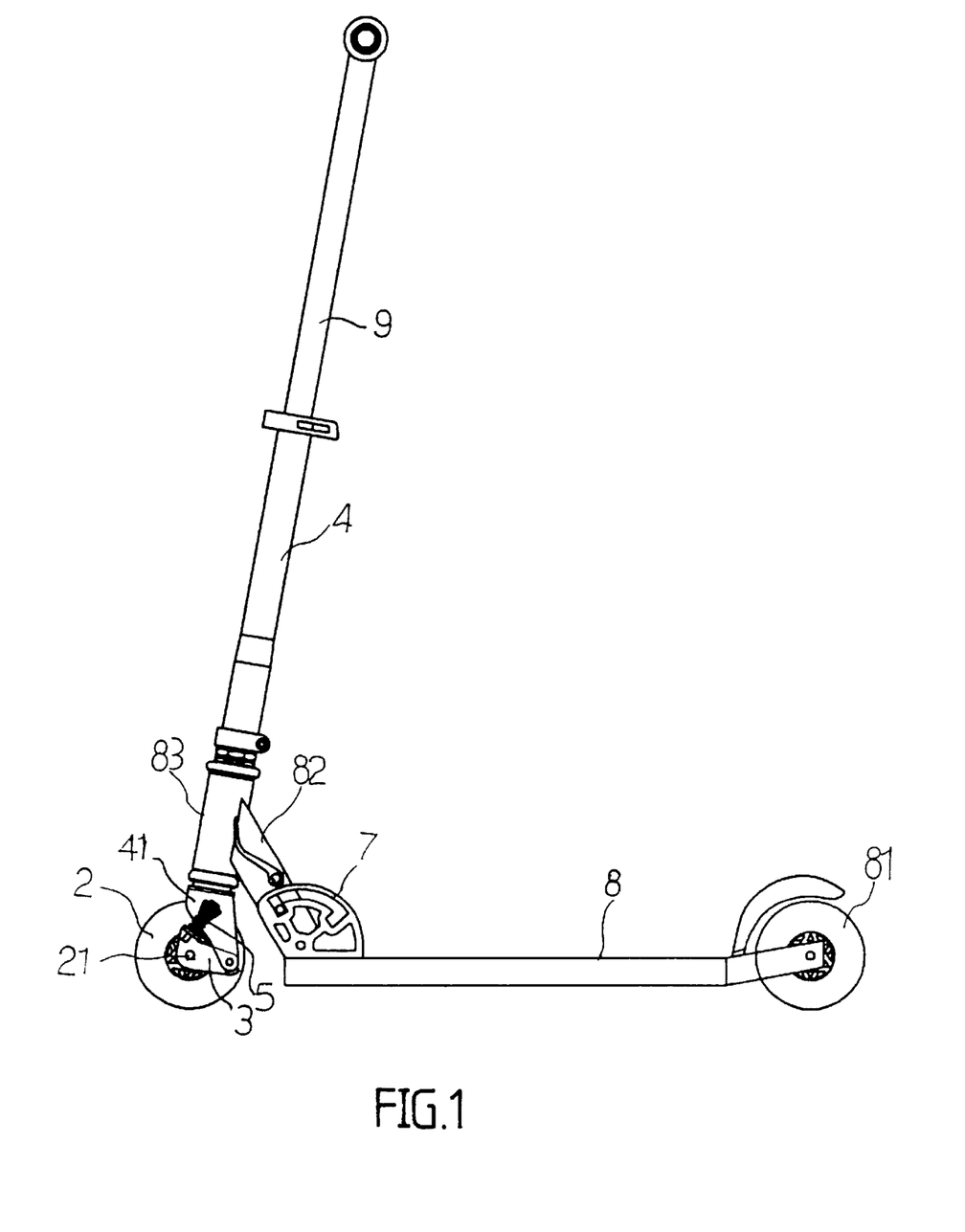
FIG. 1 is a side elevational view to show a skate cart having a front suspension device of the present invention.
Figure 2:
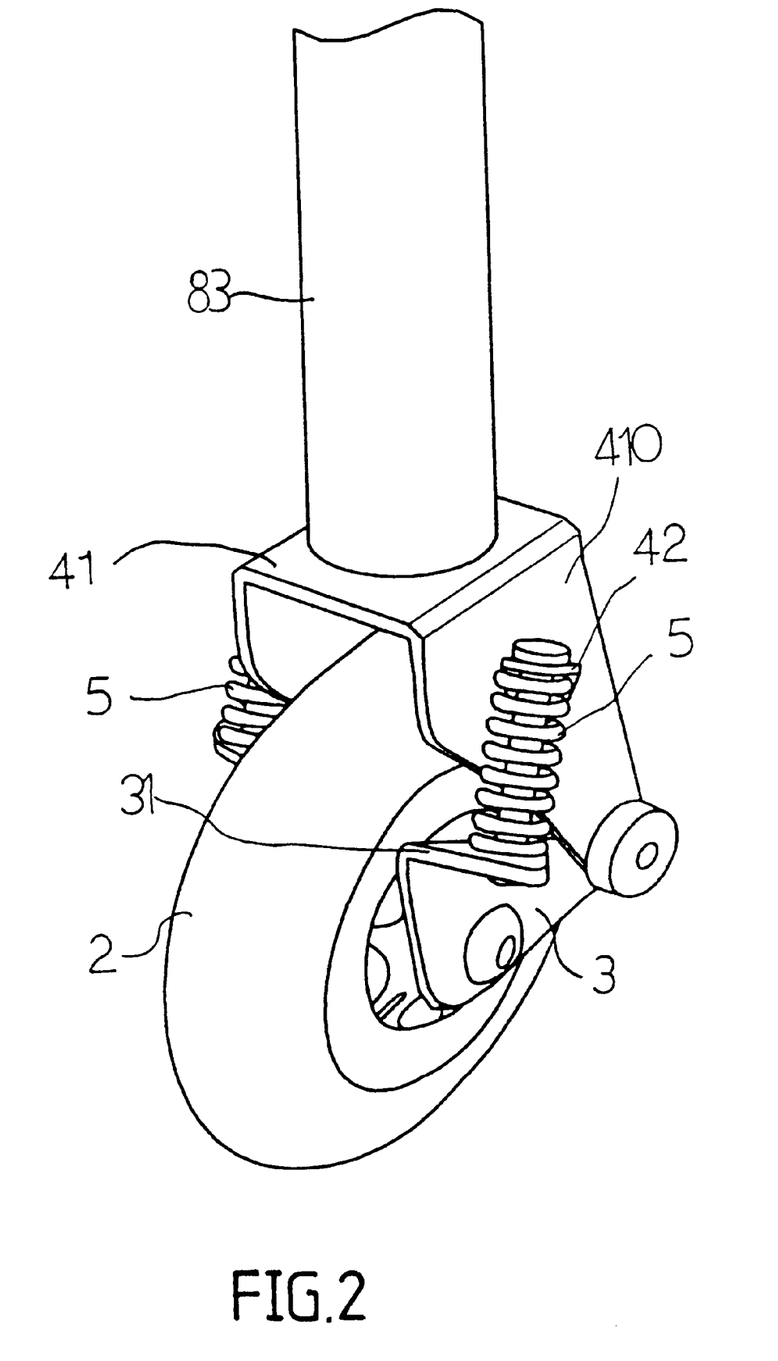
FIG. 2 is a perspective view to show the suspension of the present invention and the front fork of the skate cart.
Figure 3:
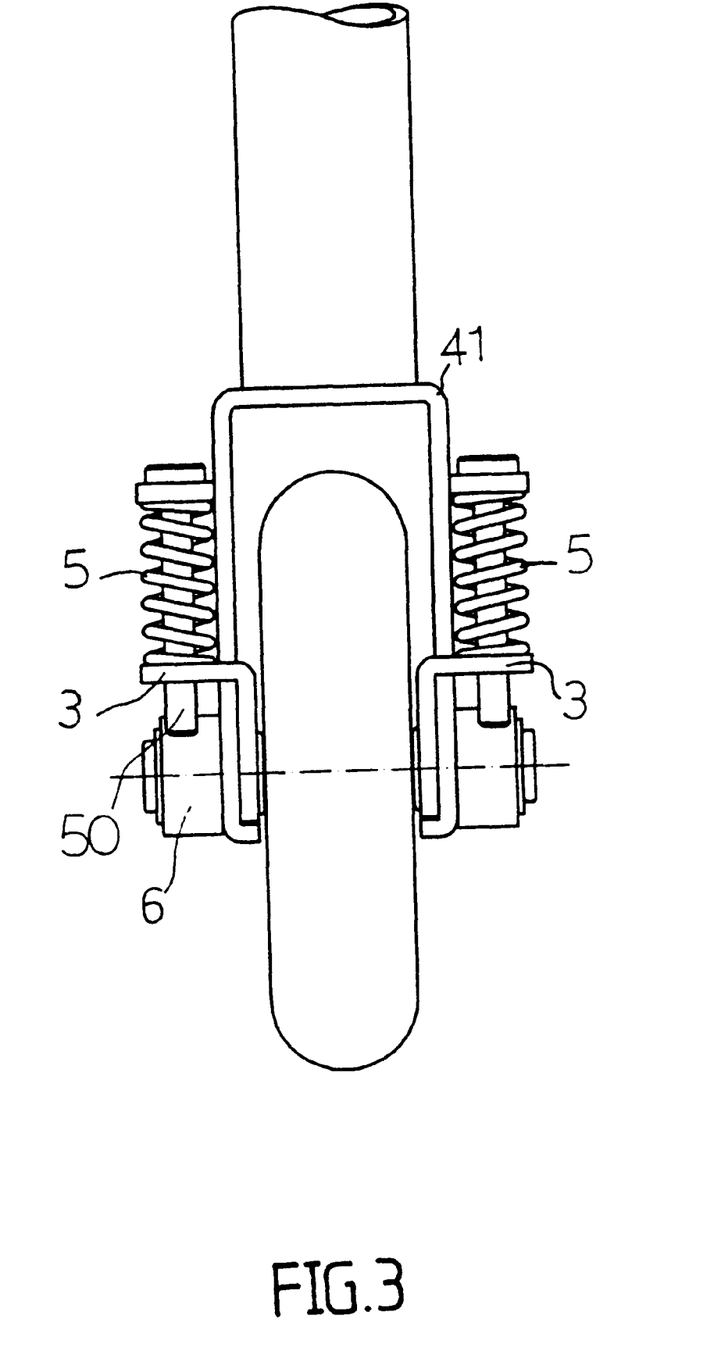
FIG. 3 is a front view to show the suspension of the present invention and the front fork of the skate cart.
Figure 4:
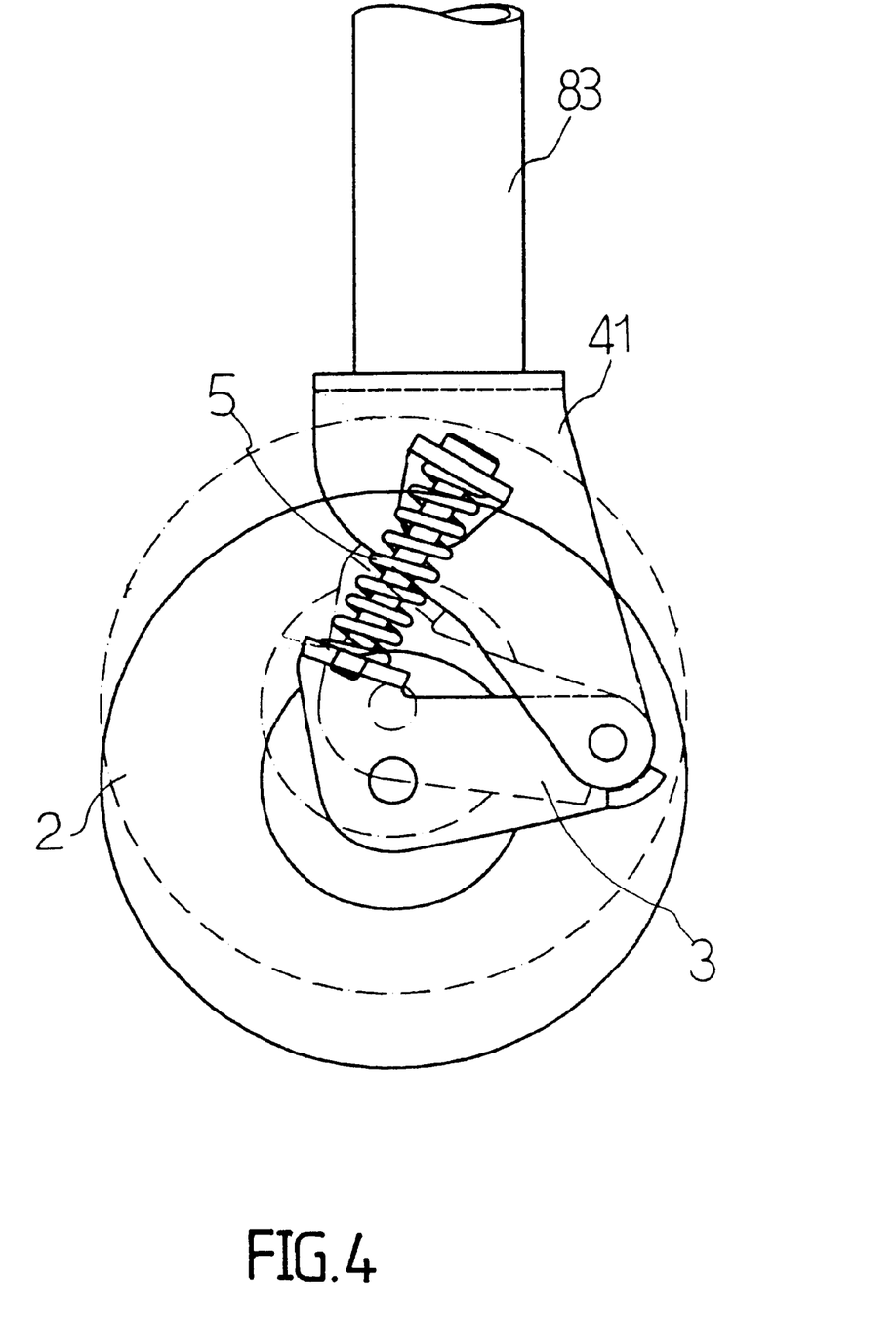
FIG. 4 is an illustrative view to show the suspension device is activated by compressing the springs.

Referring to FIGS. 1 to 4, a skate cart comprises a board 8 having a rear wheel 81 connected to a rear end of the board 8 and a connection member 82 extends from a front end of the board 8 so that a head tube 83 is connected to the connection member 82. A steerer tube 4 rotatably extends through the head tube 83 and a fork member 41 is located on a lower end of the head tube 83, and a handlebar assembly 9 is securely connected to the steerer tube 4. Two plates 3 are respectively pivotably connected to two sides 410 of the fork member 41 and a front wheel 2 is rotatably connected between the two plates 3 by extending a shaft 21 through the two plates 3 and a center of the front wheel 2. The two plates 3 each have a protrusion 31 extending from an upper edge thereof and each one of two sides of the fork member 41 has another protrusion 42 extending laterally therefrom. A rod 50 fixedly connected to the protrusion 42 on the side of the fork member 41 and the protrusion 31 on the plate 3 has a hole for a free end of the rod 50 to movably extend. There is a spring 5 mounted to the rod 50 and is retained between the two protrusions 31, 42 on the same side of the front wheel 2. In other words, one end of the spring 5 is connected to the protrusion 31 on the plate 3 and the other end of the spring 5 is connected to the protrusion on the side 410 of the fork member 41. Therefore, the front wheel 2 can be move toward the head tube 83 as shown in FIG. 4. Accordingly, when the skate cart is ridden on a serrated road, the vibration can be absorbed by the deformation of the springs 5 and the movement of the front wheel 2.

Figure 5:
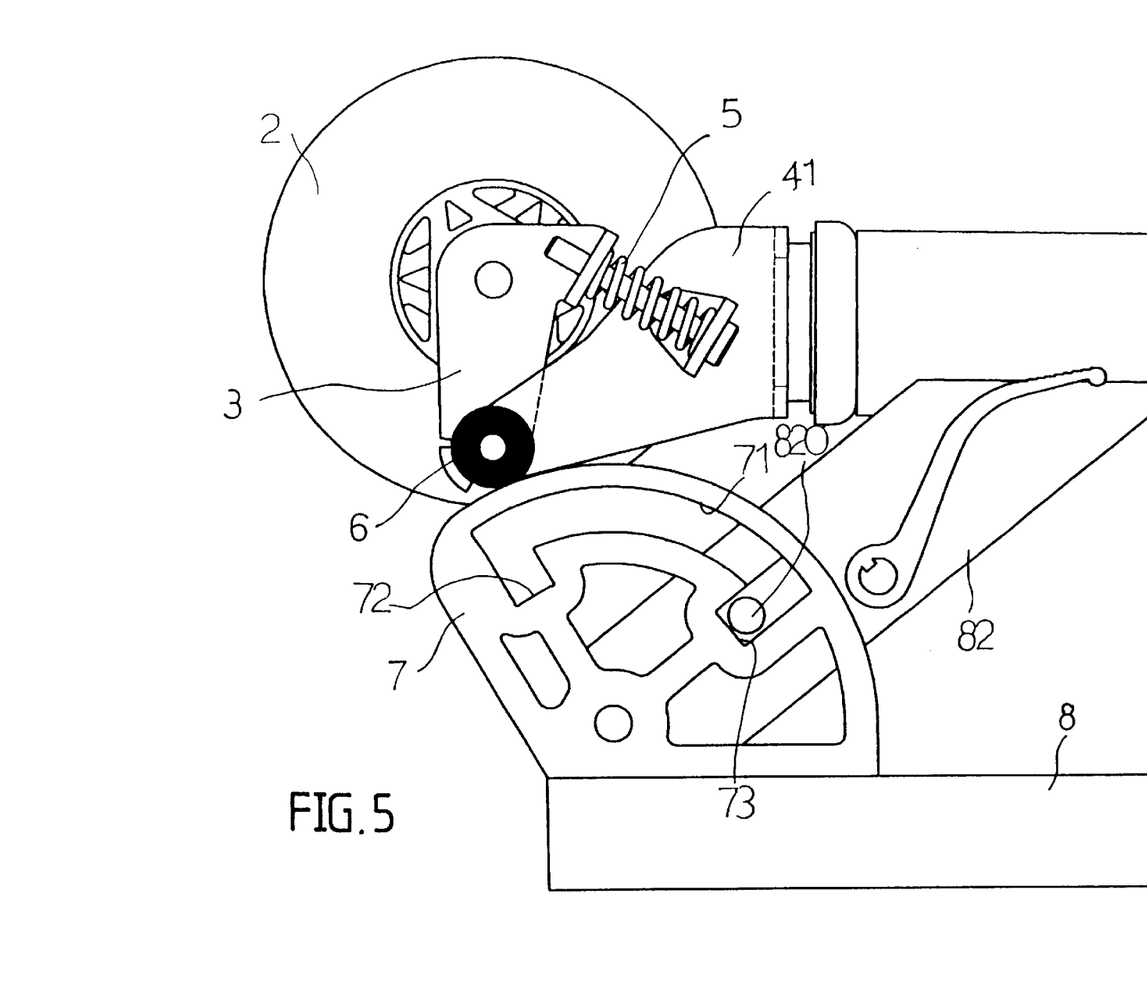
FIG. 5 is a side elevational view to show that a position member contacts a frame on the same side of the connection member when the skate cart is folded.
Figure 6:
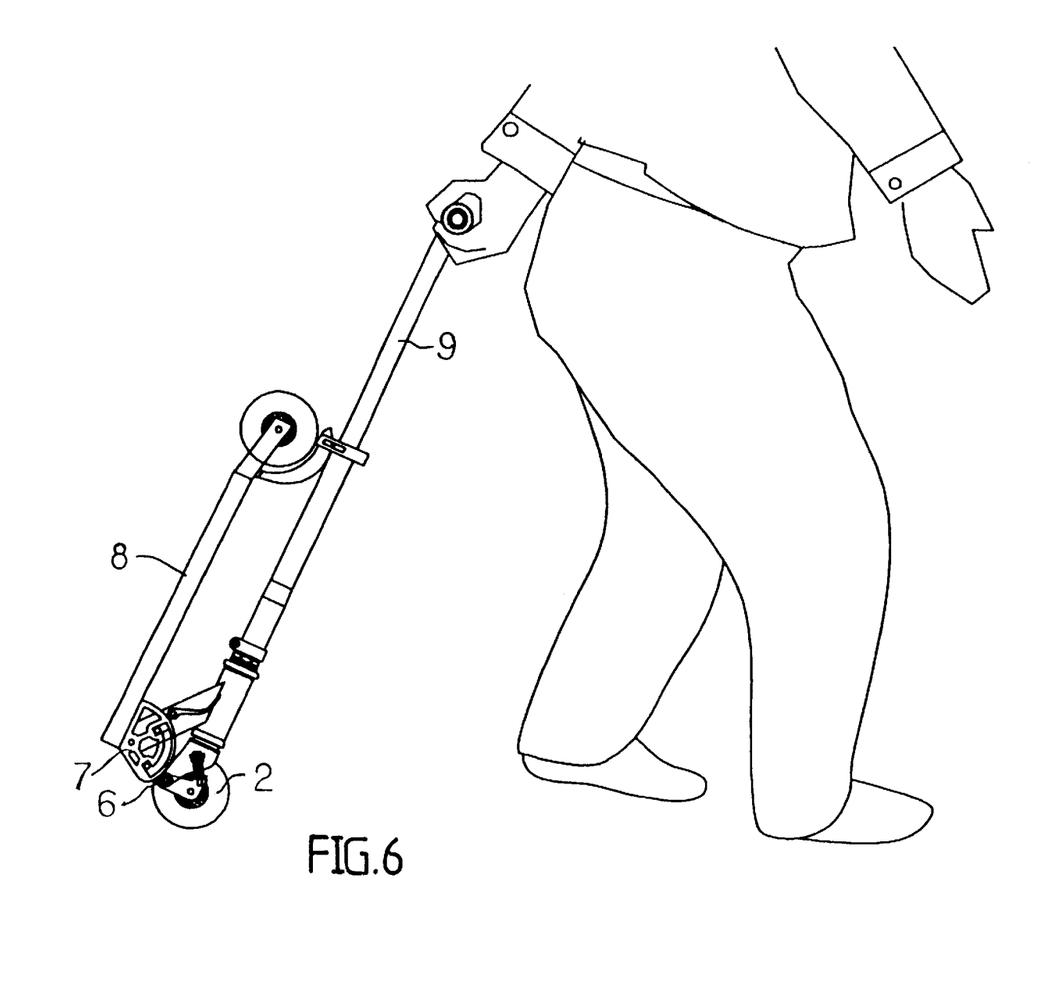
FIG. 6 is an illustrative view to show that a user pulls the folded skate cart by holding the handlebar.

Further referring to FIG. 5, two frames 7 are connected on the board 8 and the connection member 82 is pivotably connected between the two frames 7. A slot 71 and two recesses or notches 72, 73 are respectively defined in each of the two frames 7 and the two recesses 72, 73 communicate with the slot 71. A pin 820 is movably connected to the connection member 82 and the pin 820 is able to be moved within the slot 71 and be retained in one of the two notches 72, 73. By this manner, the connection member 82 together with the fork member 4, the front wheel 2, the handlebar assembly 9 are foldable toward the board 8 as shown in FIGS. 5 and 6. A position member 6 is clamped between each side of the fork member 41 and each the plate 3. The position members 6 contact the two frames 7 when the connection member 82 pivoted toward the board 8 and the folding status is maintained by the pin 820 being received in the notch 73. A user may pull the skate cart by holding the handlebar of the handlebar assembly.

Figure 7:
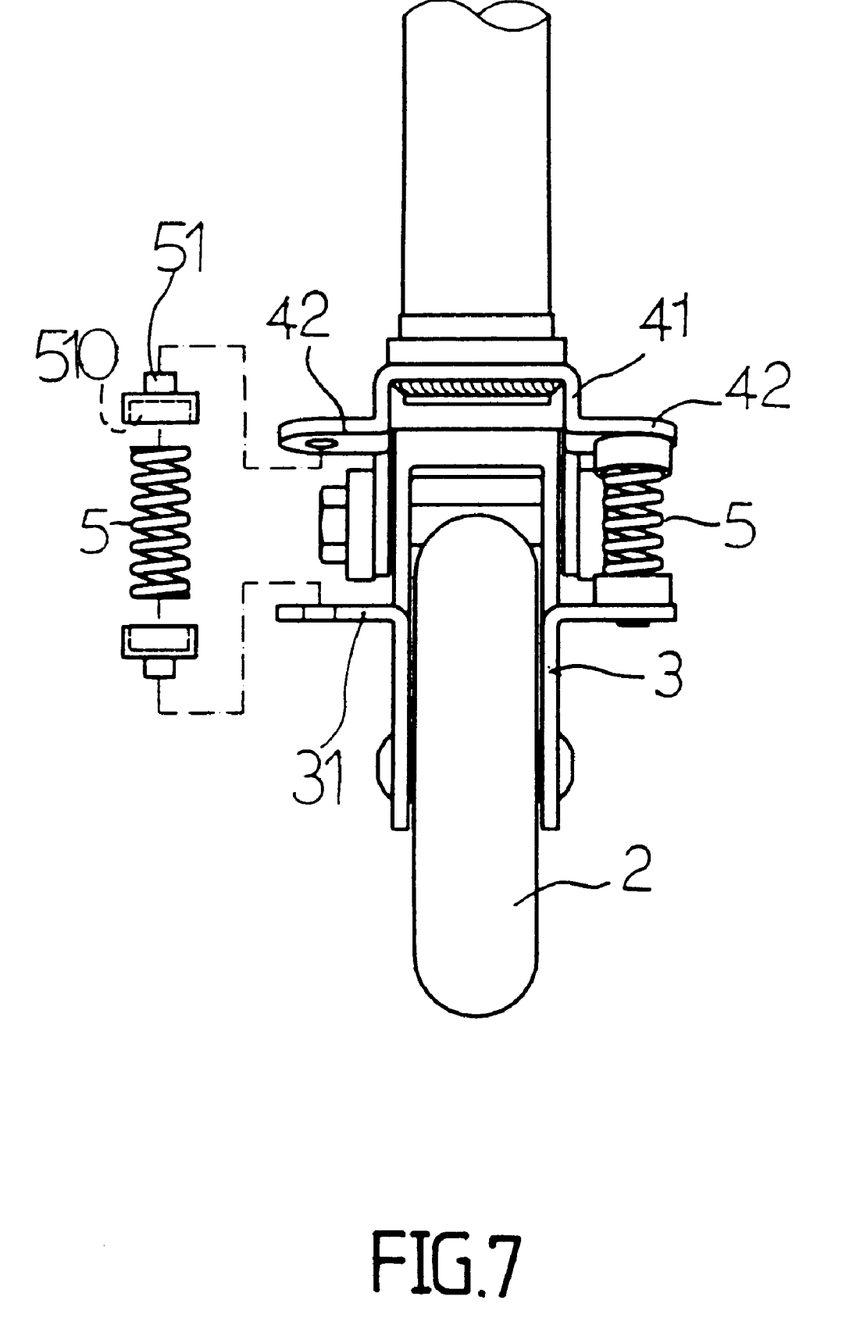
FIG. 7 is an exploded view to show another embodiment of the suspension device of the present invention.
Figure 8:
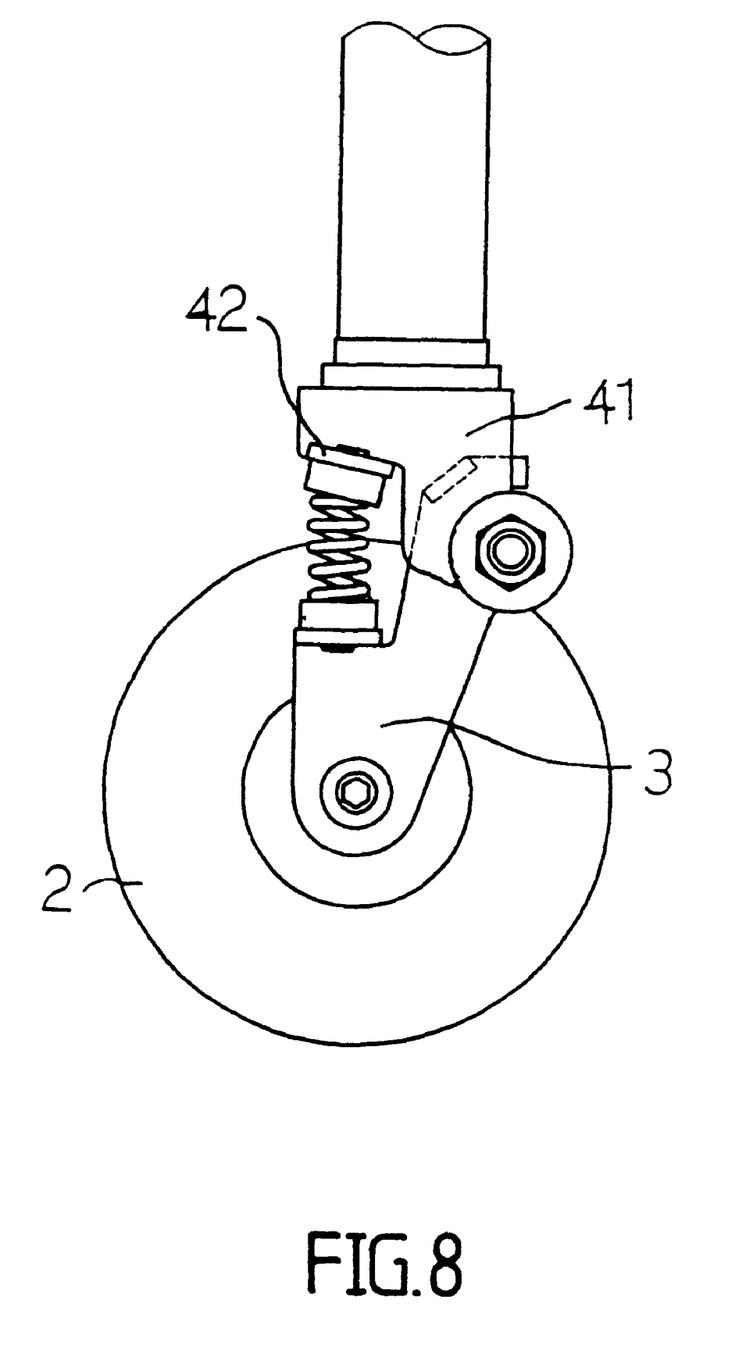
FIG. 8 is a side elevational view to show the suspension device of the present invention, the fork member and two plates between which the front wheel is located.
Figure 9:
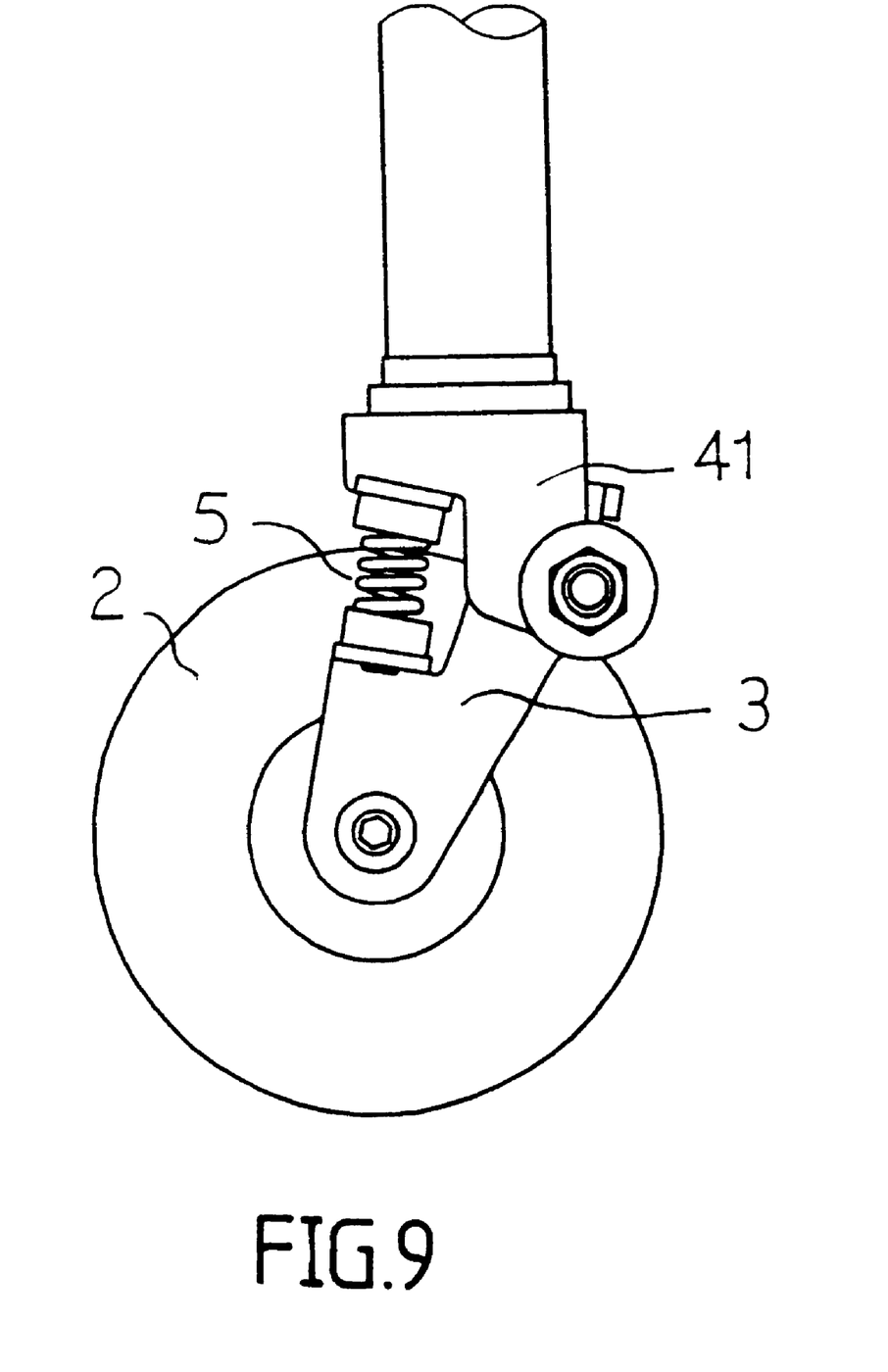
FIG. 9 is a side elevational view to show the suspension device of the present invention, wherein the front wheel is moved upward and the springs are compressed.

FIGS. 7 and 8 show another embodiment of the arrangement of the spring 5. Each protrusion 31/32 has a hole defined therethrough and two cap members 51 are respectively engaged with the two holes in the two protrusions 31, 32. Each of the cap members 51 has a recess 5 10 so that the two ends of the spring 5 are retained in the two recesses 510 of the two cap members 51. The front wheel 2 is moved upward by compressing the springs 5 as shown in FIG. 9.

While we have shown and described various embodiments in accordance with the present invention, it should be clear to those skilled in the art that further embodiments may be made without departing from the scope and spirit of the present invention.

What is claimed is:

1. A skate cart comprising:

a board having a rear wheel connected to a rear end of said board and a connection member extending from a front end of said board, a head tube connected to said connection member, a steerer tube rotatably extending through said head tube and a fork member located on a lower end of said head tube, a handlebar assembly securely connected to said steerer tube, two plates respectively pivotably connected to two sides of said fork member and a front wheel rotatably connected between said two plates, said two plates each connected to one end of a spring and the other end of each of said springs connected to respective one of said two side of said fork member, and two frames connected on said board and said connection member pivotably connected between said two frames, a position member clamped adjacent to each of said fork member, said position members contacting said two frames when said connection member is pivoted toward said board.

2. The skate cart as claimed in claim 1 further comprising a slot and two recesses defined in each of said two frames and said two recesses communicating with said slot, a pin movably connected to said connection member and said pin movably retained in one of said two recesses.

3. The skate cart as claimed in claim 1 further comprising a protrusion extending from each of said two plates and another protrusion extending from each of said two sides of said fork member, each of said springs connected between said two protrusions on the same side of said front wheel.

4. A skate cart comprising:

a board having a rear wheel connected to a rear end of said board and a connection member extending from a front end of said board, a head tube connected to said connection member, a steerer tube rotatably extending through said head tube and a fork member located on a lower end of said head tube, a handlebar assembly securely connected to said steerer tube, two plates respectively pivotably connected to two sides of said fork member and a front wheel rotatably connected between said two plates, said two plates each connected to one end of a spring and the other end of each of said springs connected to respective one of said two side of said fork member, a protrusion extending from each of said two plates and another protrusion extending from each of said two sides of said fork member, each of said springs connected between said two protrusions on the same side of said front wheel, and wherein each of said protrusions of said two plates and each of said protrusions of said two sides of said fork member have a hole, two cap members respectively engaged with said holes in said protrusions of said two plates and two cap members respectively engaged with said holes in said two sides of said fork member, each cap member having a recess so that each one of said two springs is engaged between said two recesses of said two cap members on the same side of said front wheel.

* * * * *